(No Model.) 2 Sheets—Sheet 1.
A. B. REEVES.
CULTIVATOR.
No. 307,493. Patented Nov. 4, 1884.
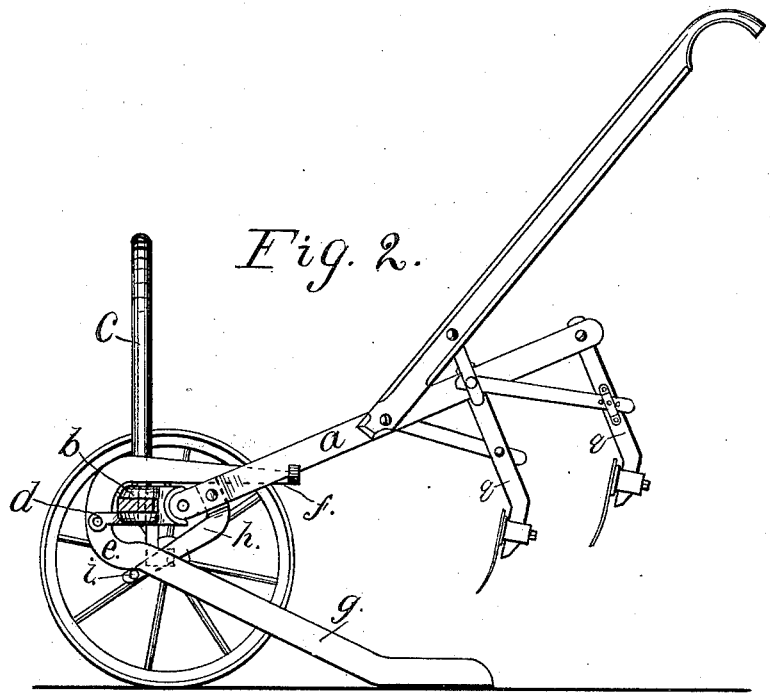
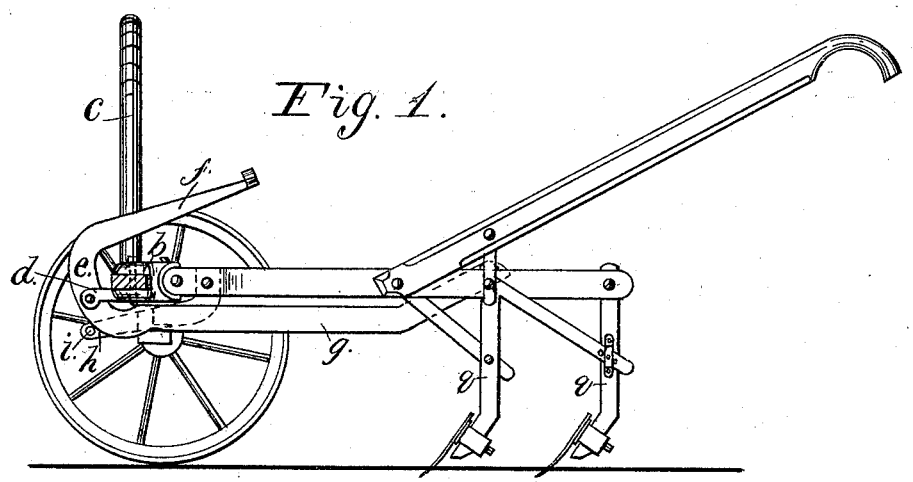
WITNESSES:
Frank A. Jacob.
E. O. Abbott
INVENTOR:
Alfred B. Reeves
By H. P. Hood.
Atty.

(No Model.)
A. B. REEVES.
CULTIVATOR.
No. 307,493. Patented Nov. 4, 1884.
2 Sheets—Sheet 2.
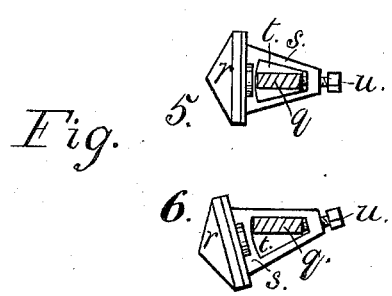
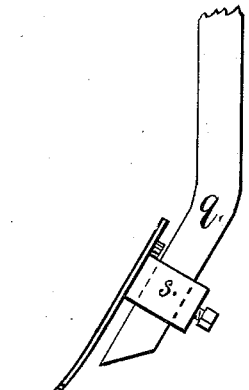
Fig. 4.
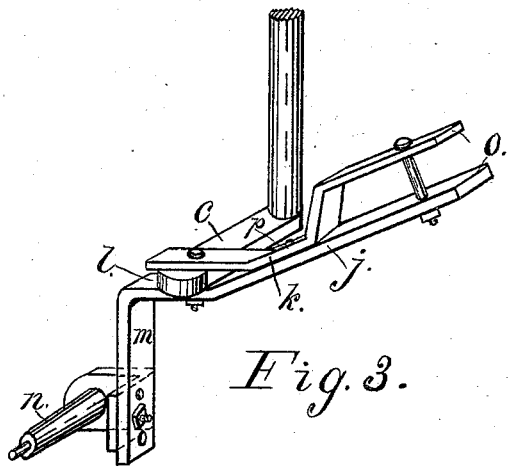
Fig. 3.
WITNESSES:
Frank A. Jacob.
E. O. Abbott.
INVENTOR:
Alfred B. Reeves.
By H. P. Hood
Atty.

UNITED STATES PATENT OFFICE.

ALFRED B. REEVES, OF COLUMBUS, INDIANA.

CULTIVATOR.

SPECIFICATION forming part of Letters Patent No. 307,493, dated November 4, 1884.

Application filed March 3, 1884. (No model.)

*To all whom it may concern:*

Be it known that I, ALFRED B. REEVES, a citizen of the United States, residing at Columbus, in the county of Bartholomew and State of Indiana, have invented certain new and useful Improvements in Cultivators, of which the following is a specification.

My invention relates to improvements in that class of cultivators known as "tongueless straddle-row two-horse cultivators."

The objects of my improvements are to provide an improved support for the cultivator-plows when raised out of the ground, an improved draft attachment, and an improved socket for attaching the plows to their standards, all as hereinafter described.

The accompanying drawings illustrate my invention.

Figure 1 is a side elevation showing the plows in position for work. Fig. 2 is a side elevation showing the plows raised. Fig. 3 is a perspective view of the draft attachment. Fig. 4 is a side elevation of one of the plows and its standard. Figs. 5 and 6 are plans of the same, the standard being shown in section.

$a$ represents the draft-beam of the plow-gang. Said beam is pivoted at its forward end to a clevis, $b$, so as to swing vertically thereon, and said clevis is secured to the arched connecting-bar $c$.

$d$ is a short arm projecting from the front part of clevis $b$.

$e$ is a bent bar pivoted to arm $d$, and forming a support for the draft-beam $a$ when said beam is raised out of working position. Said bar has a short arm, $f$, adapted to receive and support the draft-beam $a$, and a longer arm, $g$, adapted to rest upon and slide along the surface of the ground as the cultivator is drawn forward.

$h$ is a bar rigidly secured to beam $a$, projecting forward and downward therefrom, and having its forward end provided with a pin, $i$, or otherwise so formed as to engage the under side of bar $e$. When the draft-beam is raised and rests upon the short arm $f$ of bar $e$, as shown in Fig. 2, the lower part of said bar rests on the ground, and thereby sustains the plow-beam in its elevated position, and also, through the connection of the plow-beam and said bar with clevis $b$, prevents the arch from tipping backward. When the plow-beam is disengaged from arm $f$, as said beam swings downward, the forward end of bar $h$ is raised, carrying upward at the same time bar $e$ into the position shown in Fig. 1. The draft attachment is formed of two flat bars of wrought iron, $j$ and $k$. Bar $j$ is bent at right angles to form a standard, $m$, to which the axle $n$ is bolted, and one jaw of a clevis, $l$. Said bar $j$ is then bent upward at an acute angle, as shown, to form one jaw of a clevis, $o$. Bar $k$ is lighter than bar $j$, and said bars $j$ and $k$ are riveted or otherwise rigidly secured together at $p$, bar $k$ being bent outward, as shown, to form with bar $j$ the clevises $l$ and $o$. Clevis $l$ embraces and is pivoted to the arch-bar $c$, and clevis $o$ receives the single-tree, to which the draft animal is attached.

$q$, Figs. 5 and 6, represents the lower portion of one of the plow-standards.

$r$ represents the plowshare, and $s$ the socket by which the plowshare is secured to the standard.

For the purpose of providing for the adjustment of the plows on the plow-standards, I make the standard of the same rectangular section throughout, and form the socket $s$ with an angular eye, $t$. That side of said eye next the plow is made wider than the other, the narrow side being only wide enough to receive the edge of the standard $q$, and the other side being wide enough to allow the plow to be swung to either side or fastened centrally by a set-screw, $u$, in the narrow side of the socket, as clearly shown in Figs. 5 and 6.

I am aware that tapered shovel-sockets for securing the shovel or plow to its standard, and having the narrow side of the socket next the plow, and a set-screw in a movable nut in the wide side of the socket have before been made, and I do not claim such a device.

I claim as my invention—

1. In a cultivator, the combination, with a beam-coupling, a plow-beam hinged vertically thereto, and a bent bar pivoted to said coupling, so as to swing vertically thereon, and adapted to rest on the ground at one end and to support the free end of said plow-beam at the other, of bar $h$, rigidly secured to said plow-beam and adapted to engage and raise said bent bar, substantially as specified.

2. In a cultivator, the above-described draft attachment, consisting of bars $j$ and $k$, bent and joined as shown and described, and forming an axle-standard and a double clevis, substantially as and for the purposes specified.

3. In a cultivator, the combination, with a plow and a plow-standard of substantially rectangular section, of socket $s$, having an angular tapered eye, $t$, and secured to the plow with the wide side of said eye next the plow, and set-screw $u$, having its nut formed in the narrow side of said eye, all substantially as and for the purpose specified.

ALFRED B. REEVES.

Witnesses:
 M. J. CALVAN,
 M. T. REEVES.